United States Patent [19]

Wiederkehr

[11] 4,385,729
[45] May 31, 1983

[54] SPREADER FOR GRANULAR SPREADING MATERIAL

[76] Inventor: Hans Wiederkehr, Ifangstrasse 107, Rümlang, Switzerland

[21] Appl. No.: 208,500

[22] Filed: Nov. 14, 1980

[30] Foreign Application Priority Data

Nov. 15, 1979 [CH] Switzerland .................. 10210/79
Nov. 7, 1980 [CH] Switzerland .................. 8302/80

[51] Int. Cl.³ ............................................. E01C 19/20
[52] U.S. Cl. ............................................. 239/689
[58] Field of Search .............. 239/224, 455, 667, 668, 239/681, 682, 684, 689, 219, 220; 291/32

[56] References Cited

U.S. PATENT DOCUMENTS

| 425,338 | 4/1890 | Muller | 239/689 |
| 1,025,646 | 5/1912 | Roberts | 291/32 X |
| 1,793,689 | 2/1931 | Gauthier | 291/32 |
| 3,827,736 | 8/1974 | Mango | 291/32 X |
| 3,856,280 | 12/1974 | Boler et al. | 239/224 X |
| 4,261,117 | 4/1981 | Van Der Peyl | 239/455 X |

FOREIGN PATENT DOCUMENTS

15902 4/1904 Austria .......................... 239/667
537466 5/1955 Belgium ......................... 239/682

Primary Examiner—Andres Kashnikow
Attorney, Agent, or Firm—Roylance, Abrams, Berdo & Farley

[57] ABSTRACT

In a housing (1) having an inlet (3) and an outlet (4), a rotor (20) has been mounted rotatably. The rotor has rows of bristles (25) in axially extending, circularly spaced apart rows. The axes of the inlet radially extending inlet (3) and of the outlet (4) are angularly related relative to each other only so far that at least two rows of bristles fit against the inside lying peripheral wall (2) and thus guarantee a good seal of the spreading device. The shaft (22) of the rotor (20) is coupled with the drive shaft (31) of an electromotor (30) by means of a coupling (32) which in the direction of rotational torque is resilient or elastic, in order to keep the starting load of the motor (30) low. The electromotor (30) is entirely capsulated and is surrounded by a housing (33) which is connected with the housing (1). At the point of connection, a sleeve (34) provides a hermetic seal. As a result of the relatively slight deflection of the spreading material between the inlet (3) and the outlet (4), the losses due to friction in the rotor (20) are relatively small.

5 Claims, 5 Drawing Figures

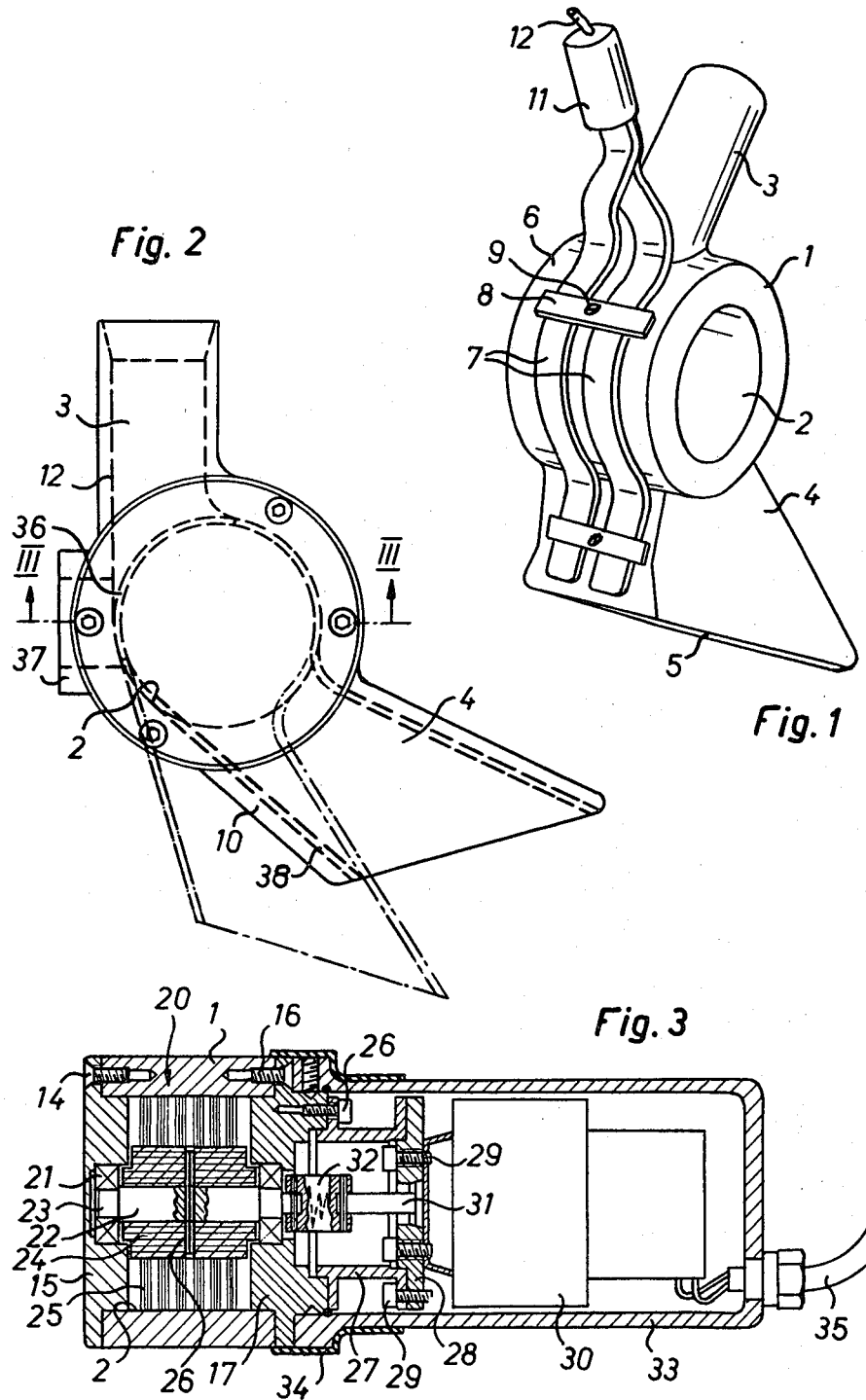

SPREADER FOR GRANULAR SPREADING MATERIAL

The invention relates to a spreader for granular spreading material with at least one motor-driven rotor which is mounted rotatably in a housing having an inlet for the feeding in of the spreading material from a container and an outlet for the centrifuging.

BACKGROUND OF THE INVENTION

Known spreaders for the spreading of mineral spreading material, for example, sand or fine gravel, on roadways covered with snow or ice, are mounted on the rear side of a vehicle or on a trailer pulled by a vehicle. They have a plate shaped rotor with approximately radial strips which flings the spreading the material laterally away from the axis of rotation of the plate, the material being dispensed from a container onto the rotor. In order to direct the spreading material into a certain direction, the rotor needs to be surrounded by a housing such that the flung away spreading material strikes the housing walls at least partly and is slowed down there. Only a certain part of the spreading material is flung unimpeded into the open through an outlet disposed in the housing. Since the spreading material moreover reaches the rotor from above, it is deflected practically by 90° which can cause the spreader to be plugged up or jammed.

In the case of motor vehicles used in winter traffic, it has been known to fling the spreading material directly in front of the driving wheels, in order to avoid with certainty on the one hand the spinning of said wheels and on the other hand to use only as much spreading material as is absolutely required for the continued travel of the motor vehicle.

BRIEF DESCRIPTION OF THE INVENTION

It is an object of the invention to develop a spreading device of the initially described type in such a way that the material entering into the spreading device is moved toward the exit without essential changes in direction and thus with low losses with little danger for plugging up, whereby however, nevertheless a directed delivery of the spreading material will be achieved.

According to the invention, this object is achieved in an apparatus in which the rotor is provided with at least approximately radial rows of bristles which terminate flush at the inside peripheral wall of the housing and form a closure between the inlet and the outlet in every position of the rotor.

The invention is illustrated in the drawing in two embodiments and is described subsequently.

FIG. 1 shows a perspective view of the housing of a spreading device,

FIG. 2 is a side view of the spreading device,

FIG. 3 shows a sectional view of the spreading device along the line III—III in FIG. 2.

Figure 4:
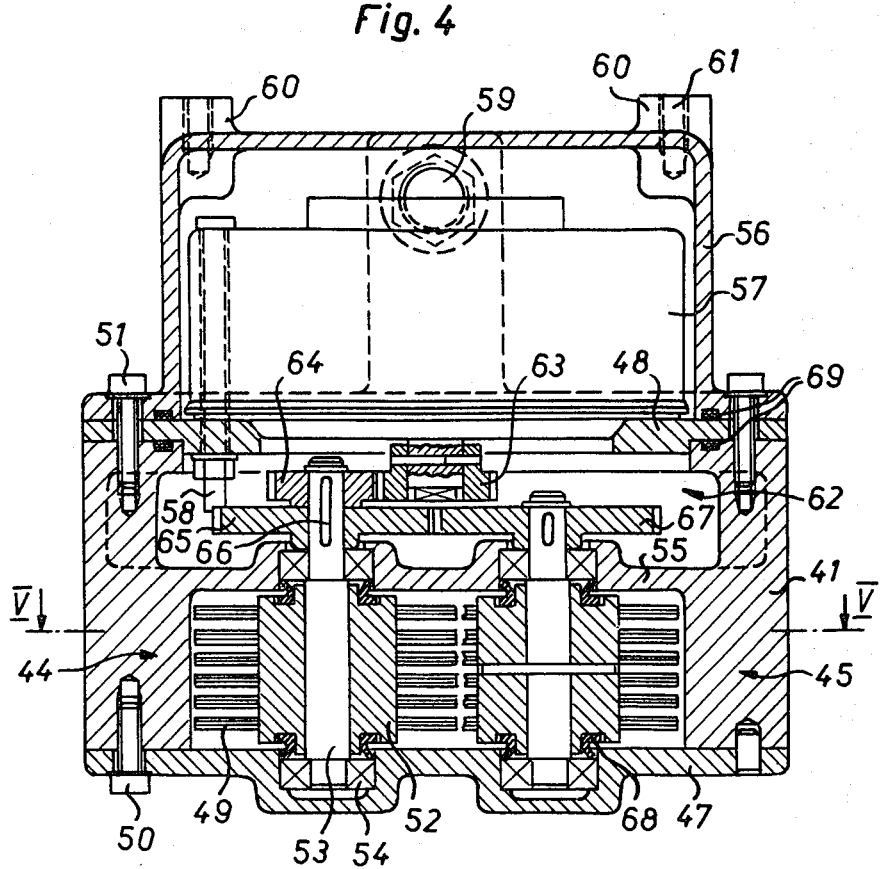
FIG. 4 shows a sectional view of a second spreading device with two rotors and FIG. 5 shows a cut along the line V—V in FIG. 4.

The housing 1, shown in FIG. 1, of a spreading device has a cylindrical inside wall 2, an inlet 3, which has been developed as a cylindrical sleeve and an outlet 4 which has the shape of a rectangular pipe, which expands in the direction of a free end 5. On the outside wall 6 of the housing 1, two heating bars 7 lying side by side and adapted to the shape of the housing 1 are attached by means of clamping strips 8 which are attached by means of a screw 9 to the housing 1. The heating bars 7 also extend over one of the four walls of the outlet 4 which, see FIG. 2, forms a part 10 of the wall departing tangentially from the cylindrical inside wall 2. The heating bars 7 are brought together with a coupling 11 to which the electric feed line 12 leads. A heating bar 7 could also pass over the opposite housing wall so that practically the entire housing is heated. From FIG. 2, it is evident that the inlet 3 too has a wall part 12 running tangentially in relation to the inside wall 2 of the housing 1, in relation to which wall part (12) the tangential wall part 10 of the outlet 4 has been slightly inclined, however, the closed angle is only a little below 180°, effectively about 130°-170°, as a result of which the spreading material entering into the inlet 3 need be deflected only a little in the housing 1 into the direction of the outlet 4. In the housing 1, see FIG. 3, which is closed by a cover 15, attached by screws 14 and by a bottom attached with screws 16, a rotor 20 is mounted in roller bearings 21 rotatably in the cover 15 and in the bottom 17. The rotor 20 has a shaft 22 with terminal pegs 23 in the roller bearings 21. The shaft 22 is surrounded by a rotor body 24 which is the carrier of rows of bristles 25 disposed at a distance and running axially or helically. The rows of bristles 25 extend flush right up to the inside wall 2 of the housing 1. The rotor body 24 is attached with a peg 26, for example, a spring cotter, to the shaft 22.

The bristles of the rows 25 of bristles may consist of plastic, for example, of nylon. It is also possible to use flexible lamellae of plastic or steel. The rows of bristles or lamellae may be inclined precisely radially or in the direction of rotation or else counter to the direction of rotation. By the term rows of bristles as used, thus all types of embodiment, even such without any bristles are to be understood.

On the bottom 17 a hub 27 has been attached by screws 26' to which a carrier flange 28 is screwed by means of screws 29. An electromotor 30 has been attached by means of screws 29', the drive shaft 31 of which is coupled by means of a resilient coupling 32 with the shaft 22 of the rotor 20. The coupling 32 is resilient in the direction of the periphery and therefore the coupling body may consist of an elastomer or of a spiral spring. Thus, in the case of starting the control device, in which there still may be some remnants of the spreading material, any overload of the electromotor 30 will be avoided. The electromotor 30 is completely encapsulated by a housing 33 which has been put onto the bottom 17 of the housing 1 and is sealed by an elastic sleeve 34. An electric supply line 35 is likewise sealed at its transition into the motor housing 33.

In operation, the spreading material arriving through the inlet 3, is seized by the motor and after acceleration of said motor, is flung out through the outlet 4 without any essential deflection.

Whenever a certain possibility for adjustment of the outlet 4 is to be achieved, a thin-walled metal sheet 38 is inserted into the housing, see FIG. 2, which on the inlet side has a slit 36 for the admission of the spreading material through the inlet 3. In the outlet 4, the tangential wall part 10 is removed so that the sheet metal plate 38 may be turned so far as the extreme position drawn in a broken line, as a result of which the direction of the emerging spreading material may be adjusted.

The spreading device is also suitable for double arrangements. Either two electromotors each with a spreading device are coupled in series for this purpose, or one electromotor with spreading devices disposed on both sides at the ends of the shafts is used. As a result of that, a space saving unit is created with two rotors which, for example, may be used in the case of twin driving wheels of trucks. Changes of the spreading devices are not necessary; they may be composed and disposed according to the existing situation. Whenever the distance between the two spreading devices is too great because of the intermediate electromotor, one continuous shaft may be used on which a miter wheel gearing is disposed, so that the electromotor lies perpendicularly in relation to the shaft.

In the case of larger spreading devices, it will be necessary to use centrifugal coupling instead of the resilient coupling 32, in order that the starting of the electromotor 30 may be accomplished without load. In very tight space conditions it will be possible to dispose the resilient coupling 32 in to the inside of the rotor body 24 in order to decrease the overall construction length.

A mounting support 37 disposed on the motor housing 33, see FIG. 2, may be used for the attachment of the spreading device to the motor vehicle. In order to be able to select the direction of the outlet independently of the attachment, the housing 1 is rotatable relative to housing 33.

The miter wheel gearing mentioned for the drive of the two spreading devices may naturally also be used for the drive of only one spreading device, whenever such an arrangement is necessary for reasons of space. The rotor and its pertinent parts however remain unchanged.

Figure 5:
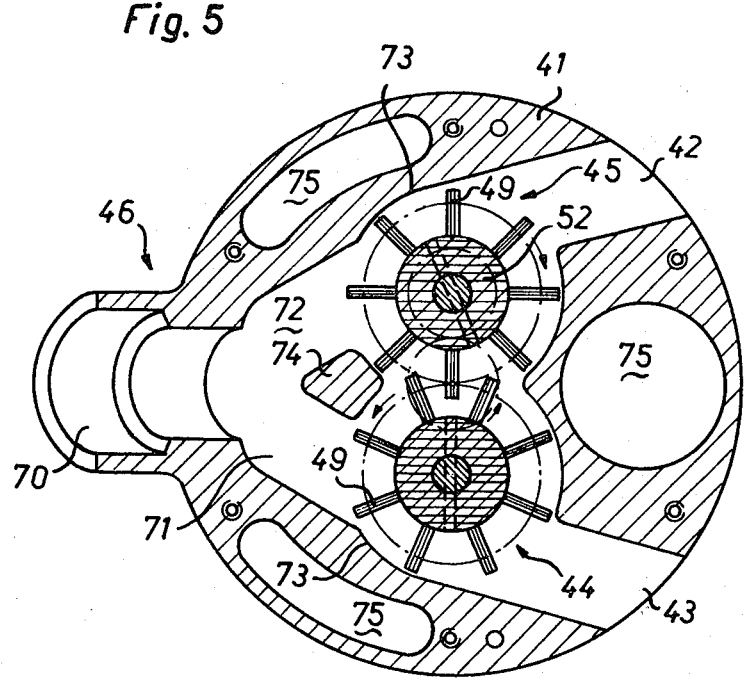

It is also possible, as shown in FIGS. 4 and 5, to house two rotors 44, 45 in a single housing 41 with two outlets 42, 43, so that the rotors 44, 45 rotate in a contrary sense and each conveys into one of the outlets 42, 43. The inlet 46 on the other hand has been executed as a single pipe which leads into the middle between the two rotors 44, 45.

The housing 41 is closed by a bottom 47 and by a cover 48; both are attached by means of screws 50, 51. Each of the two rotors 44, 45 is developed the same as the rotor shown in FIG. 3 and has a rotor body 52 which carries rows of bristles 49 disposed at a distance and is seated on a shaft 53 which is mounted in roller bearings 54 in the bottom 47 and in an intermediate bridge 55 of the housing 41. The rows of bristles 49 in this case, too, may run either precisely axially or helically.

An electromotor 57 in a housing 56 is mounted on the cover 48. The housing 56 has been attached by screws 51 on the housing 41 and the electromotor 57 has been attached with screws 58 on the cover 48. An opening 59 serves for the introduction of a current connection for the electromotor 47. Eyes 60 with a threaded bore 61 are disposed on the housing 56 for the attachment of the spreading device.

In the space between the cover 48 and the intermediate bridge 55, a two-stage gearing 62 has been disposed, the first stage of which comprises a pinion 63 seated on the shaft of the electromotor 57 and the first gear 64. The first gear 64 and the first driving gear 65 are attached by means of a partial connection 66 on the shaft 53 of the rotor 54, while a second driving gear 67 on the shaft 53 of the rotor 45 meshes with the first driving gear 65 and constitutes the second stage of the gearing 62. Gaskets 68, 69 on the rotor body 52 or on the cover 48 serve for sealing the roller bearing 68 or the housings 41, 57.

From FIG. 5, the arrangement of the rotors 44, 45 in the housing 41 is apparent. The rows of bristles 49 disposed at a distance of the two rotors 44, 45 lying side by side engage with one another; the width of the spreading device may be decreased thereby. An inlet 46 has an inlet connection 70 which divides in the inside of the housing 41 and passes over into two inlet channels 71, 72 which have approximately the same direction as the two outlets 42, 43. By means of a circular wall part 73 disposed between the inlet channel 71, 72 and the outlets 42, 43, one will achieve that the rotors 44, 45 reliably prevent the direct passage of spreading material by in most cases two rows of bristles 49 fitting against the circular wall part. In this case, the inlet channels 71, 72 do not pass over precisely tangentially into the circular wall part 73, instead of that, the passage of the spreading material through the rotors 44, 45 takes place with a very slight change of direction which is rather even less or slighter than in the case of the embodiment of the spreading device according to FIG. 3 and amounts to at most about 30°.

The inlet channels 71, 72 are separated from one another by a dividing bridge 74 which is disposed on the inlet side in front of the intermeshing rows of bristles 49 of the rotors 44, 45. Recesses disposed in the housing 41 have the purpose of decreasing the weight.

The two outlets 42, 43 will permit to move the spreading material to two places, whereby, depending on the position of the spreading device, the spreading material may be flung to two rear wheels or to a twin wheel of a motor vehicle.

I claim:

1. A spreading device for spreading granular material comprising the combination of
   a spreader housing having means defining an inlet conduit, an outlet conduit and a rotor chamber between said inlet and outlet conduits,
   said rotor chamber having cylindrical wall portions,
   said outlet conduit having a generally rectangular passageway in cross section, one wall of said passageway being straight, flat and tangential to a wall portion of said rotor chamber,
   said inlet conduit having a wall portion tangential to said wall portion of said rotor chamber, and
   the central axes of said inlet and outlet conduits forming an obtuse angle of between about 130° and 170°;
   a rotor in said rotor chamber, said rotor having
   a hub, and
   a plurality of spaced rows of radially extending flexible bristles;
   said rows being arranged so that at least two rows fit against the cylindrical wall portions of said chamber;
   a drive motor; and
   resilient coupling means interconnecting said drive motor and said rotor hub.

2. A spreading device for spreading granular material comprising the combinations of
   a spreader housing having means defining an inlet conduit, an outlet conduit and a rotor chamber between said inlet and outlet conduits,
   said rotor chamber having cylindrical wall portions, said outlet conduit having a wall portion extending tangentially from a cylindrical wall portion of said chamber, the central axes of said inlet and outlet conduits forming an obtuse angle of between about 130° and 170°;

first and second rotors in said rotor chamber, said rotors being rotatably mounted therein with their axes substantially parallel, each of said rotors having a hub, and a plurality of spaced rows of radially extending, flexible bristles, said rotor axes being spaced such that the rows of bristles thereon interengage with each other;

said spreader housing further including web means extending across the inlet region of said chamber adjacent the location at which said rows interengage for dividing the inlet region into two channels;

a drive motor; and reduction gear means interconnecting said motor and both of said rotors for driving the rotors concurrently.

3. A spreading device according to claim 1 or 2 and further comprising a motor housing enclosing said motor, said motor housing being rotatably coupled to said spreader housing.

4. A spreading device according to claim 1 or 2 and further comprising a heating element thermally coupled to the exterior of said spreader housing.

5. A spreading device according to claim 2 wherein the walls of said channels opposite said web means intersect said cylindrical wall portions of said chamber at an angle of about 30°.

* * * * *